United States Patent [19]

Marcus

[11] 4,447,808
[45] May 8, 1984

[54] REARVIEW MIRROR TRANSMITTER ASSEMBLY

[75] Inventor: Konrad H. Marcus, Holland, Mich.

[73] Assignee: Prince Corporation, Holland, Mich.

[21] Appl. No.: 303,490

[22] Filed: Sep. 18, 1981

[51] Int. Cl.³ .................... H04B 7/00; H04B 1/03
[52] U.S. Cl. .................... 340/696; 49/25;
 340/825.69; 340/825.72; 455/99
[58] Field of Search ............ 340/696, 825.69, 825.72,
 340/32; 455/99; 350/276 R; 343/711, 720;
 49/25

[56] References Cited

U.S. PATENT DOCUMENTS

| | | | |
|---|---|---|---|
| 3,680,951 | 8/1972 | Jordan et al. | 350/281 |
| 4,078,859 | 3/1978 | Sharett | 350/279 |
| 4,241,870 | 12/1980 | Marcus | 340/696 |
| 4,247,850 | 1/1981 | Marcus | 340/825.69 |

FOREIGN PATENT DOCUMENTS 2839849  3/1979  Fed. Rep. of Germany ...... 343/720
2754117  6/1979  Fed. Rep. of Germany .... 340/38 R

OTHER PUBLICATIONS

*Electronics World,* "A New Garage Door Opener" Frye, Feb. 1965, pp. 56, 57.

Primary Examiner—James J. Groody
Attorney, Agent, or Firm—Price, Heneveld, Huizenga & Cooper

[57] ABSTRACT

A housing for a transmitter is adapted to be mounted to a rearview mirror. The housing includes a switch and a battery for momentarily actuating the transmitter to activate a remotely positioned device. The housing for the transmitter, power supplying battery and switch forms a relatively compact package which can be secured to or integrally formed with the rearview mirror of a vehicle.

7 Claims, 4 Drawing Figures

REARVIEW MIRROR TRANSMITTER ASSEMBLY

BACKGROUND OF THE INVENTION

The present invention pertains to a transmitter assembly for activating a remote device and particularly to an assembly for mounting in association with a vehicle rearview mirror.

Transmitters located in vehicles for operating remote devices such as garage door openers or the like have gained increasing popularity in recent years. Typically, in a garage door opening system, the transmitter is positioned in a compact package typically clipped to the dashboard of the vehicle or over a visor for use. U.S. Pat. Nos. 4,241,870 and 4,247,850 each assigned to the present assignee disclose unique mounting arrangements for garage door opening transmitters. In the first patent the transmitter is removably mounted in a housing which integrally includes overhead lights. In the second patent the transmitter is integrally included in the sun visor of the vehicle. Such installations are typically purchased as an original equipment option with new vehicles.

SUMMARY OF THE PRESENT INVENTION

The system of the present invention provides a transmitter which can be sold as an original equipment option or separately purchased and attached to the rearview mirror of a vehicle. In the preferred embodiment of the present invention, a housing includes transmitter means and can be mounted to a rearview mirror. The housing includes switch means and a battery for momentarily actuating the transmitter to activate a remotely positioned device. The housing for the transmitter means, power supplying battery and switch forms a relatively compact package which can be secured to or integrally formed with the rearview mirror of a vehicle. In the preferred embodiment the switch means couples the battery to the transmitter and is positioned on the side of the assembly adjacent the vehicle operator for easy access.

With such a system, the transmitter is positioned in the optimum location for transmission of radio frequency energy, for example, forwardly of the vehicle toward a garage door opening receiver. Further, such an assembly can be integrally included within the mirror assembly or separately provided as an add-on package to an existant rearview mirror. These and other features, objects and advantages of the present invention will become apparent upon reading the following description thereof together with reference to the accompanying drawings in which:

DETAILED DESCRIPTION OF THE PREFERRED EMBODIMENT

Figure 1:
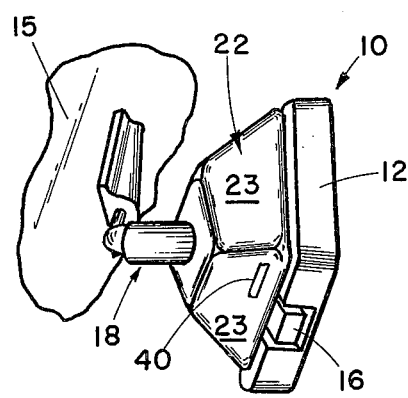
FIG. 1 is a fragmentary perspective view of a mirror assembly embodying the present invention taken toward the lower left corner thereof.

Referring now to the figures there is shown a rearview mirror assembly 10 embodying the present invention. The assembly in the preferred embodiment of the invention includes a mirror housing 12 for supporting therein a conventional rearview mirror 14. Housing 12 includes an internally mounted tilt mechanism including a lever 16 extending from the bottom of the housing for tilting the mirror slightly to reduce glare from oncoming vehicles. Housing 12 is secured to a windshield 15 (FIG. 1) of a vehicle, typically in a centered position between the sun visors, by means of a conventional mounting bracket assembly 18 permitting pivotal movement of the mirror assembly to a desired adjusted position.

Mirror housing 12 is conventional and includes a generally convexly shaped rearwall 13 (FIGS. 2 and 4) to which there is attached transmitter means 20 for controlling a remotely positioned device such as a garage door opening receiver and associated door opening mechanism. Transmitter means 20 includes a second housing 22 molded of a polymeric material such as polycarbonate which is transparent to the RF energy radiated by a transmitter 30 contained therein. Housing 22 includes a forward wall 21 which is secured to rearwall 13 of the mirror housing 12 by a suitable bonding adhesive. The housing includes a peripherally extending sidewall 23 which includes a concave recess 25 (FIG. 3) centered and at the top edge for permitting pivot assembly 18 to extend directly to the rear surface of mirror housing 12. Recess 25 effectively divides housing 22 into two sections, one of which includes the transmitter 30 and the other of which includes a power supply such as a battery 32 for providing operating power to transmitter 30.

Figure 3:
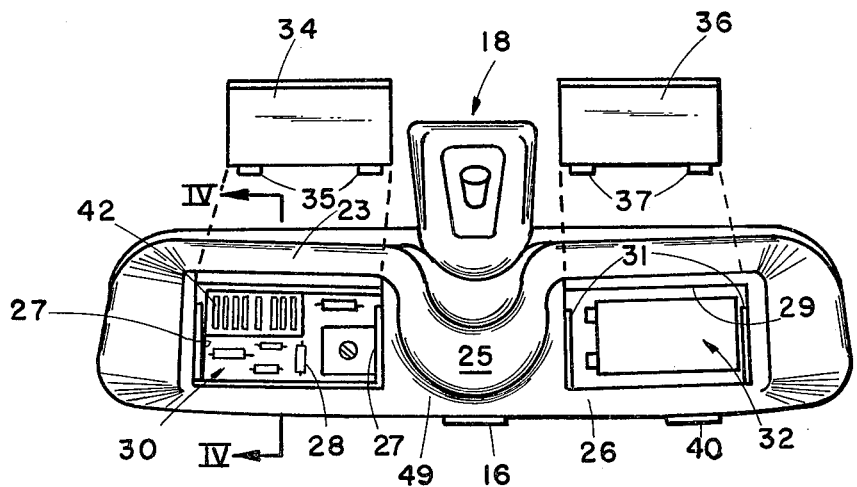
FIG. 3 is a rear elevational view of the structure shown in FIGS. 1 and 2.

Integral with the front wall 21 and sidewall 23, is a rear wall 26 including a pair of apertures 28 and 29 permitting access to both the transmitter 30 and battery 32. Aperture 28 includes a pair of guide tracks 27 on opposite sides thereof for guidably receiving a slidable closure door 34 including a pair of spaced locking tabs 35 extending along one edge for snap-locking door 34 over opening 28 in a conventional manner. Similarly, opening 29 is normally enclosed by a second sliding door 36 similarly including a pair of locking tabs 37 and which is slidably supported by guide tracks 31 on opposite edges of opening 29 and integrally formed within rear wall 26 for transmitter housing 22. In FIG. 3 the sliding doors 34 and 36 are shown in a removed position to more clearly show the installed position of transmitter 30 and battery 32.

Mounted on the lower left hand side of wall 23 is switch means 40 comprising a single pole single throw push button switch electrically serially coupled between battery 32 and transmitter 30 for selectively applying operating power momentarily to the transmitter when operator actuated for radiating RF energy forwardly through the windshield of the vehicle for activating the remote receiving device. Switch 40 is thus positioned on the vehicle operator's side when the assembly is mounted to the vehicle to provide ready access for the vehicle operator.

Figure 4:
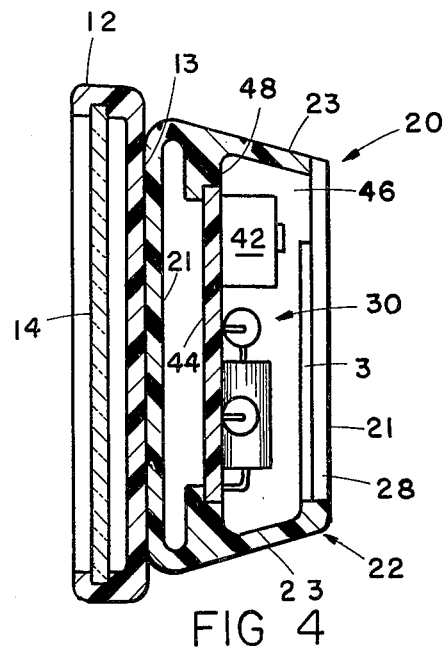
FIG. 4 is an enlarged cross-sectional view taken along section lines IV—IV of FIG. 3.

Transmitter 30 is of the same general type as disclosed in the above identified U.S Pat. No. 4,241,870, the disclosure of which is incorporated herein by reference and includes a digital switch 42 having seven different switch contacts which can be moved to provide a seven bit binary code uniquely identifying a garage door installation. Thus, by removing cover door 34, access to switch 42 is provided permitting programming of the switch in a given installation. Switch 42 and the remaining electrical components of transmitter 30 are mounted to a circuit board 44 which, in turn, as best seen in FIG. 4 is secured within the interior space 46 of housing 22 to a peripheral mounting boss 48 in a conventional manner by for example fastening screws, bonding adhesive, or the like. Power supplying conductors extend between battery 32 and transmitter 30 through switch 40 and extend through the bridge area 49 (FIG. 3) between the left and right side of transmitter housing 22 below concave recess 25 to interconnect the power supply with the transmitter.

Figure 2:
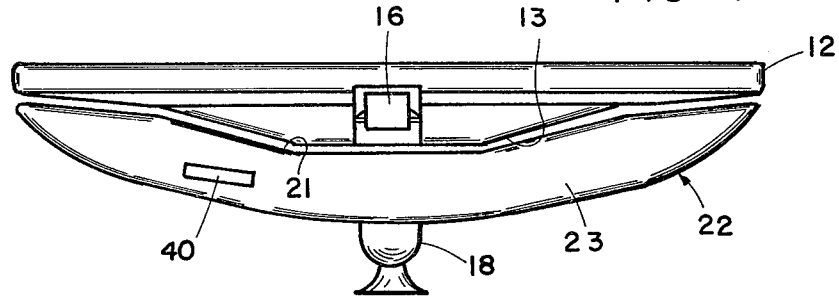
FIG. 2 is a bottom plan view of the structure shown in FIG. 1.

As best seen in FIG. 2 the forward wall 21 of transmitter housing 22 is generally concavely shaped to conform to the contour of rear surface 13 of the mirror housing 12. In the preferred embodiment housing 22 and the transmitter contained therein is separate from, but attached to, the existant interior rearview mirror. The elongated generally rectangular housing 22 preferably is shaped to generally conform to standard mirror packages. In other embodiments of the present invention, housing 22 can integrally include the mirror 14 and mirror tilt control mechanism including lever 16 and mounting assembly 18 if desired. In such case the unit is suitable for sale as original equipment in a vehicle or as a replacement part. Also, in some embodiments, it may be desired to eliminate wall 21 and attach sidewall 23 to the rearview mirror. Also, the vehicles own power source could be used in place of battery 32.

These and other modifications to the preferred embodiments of the invention as described and disclosed herein will become apparent to those skilled in the art and can be made without departing from the spirit or scope of the invention as defined by the appended claims.

The embodiments of the invention in which an exclusive property or privilege is claimed are defined as follows:

1. A transmitter for use in connection with an interior rearview mirror of a vehicle said rearview mirror including a housing having a rear wall with means for supporting the same in the interior of said vehicle and a front supporting a mirror element, said rear wall of said housing having a predetermined configuration, comprising:

a transmitter housing having a forward wall, a rear wall, and sidewalls providing an enclosure, said forward wall having a configuration corresponding at least along the peripheries thereof to the configuration of the rear wall of said rearview mirror, said transmitter housing being adapted to be secured to the rear wall of said rearview mirror housing when so secured together gives said housing the appearance of a one-piece housing;

transmitter means mounted within said transmitter housing for radiating energy generally forwardly of the vehicle for activating a remotely positioned device; and means mounted to said transmitter housing in a position readily accessible to the vehicle operator for activating said transmitter means.

2. The apparatus as defined in claim 1 wherein said means for activating said transmitter means comprises switch means.

3. The apparatus as defined in claim 2 and further including a battery mounted within said housing and electrically coupled to said transmitter means by said switch means for providing operating power to said transmitter means.

4. The apparatus as defined in claim 3 wherein said transmitter means is mounted on one side of said housing and said battery is mounted in the opposite side of said housing.

5. The apparatus as defined in claim 4 wherein said housing includes a pair of access doors positioned to provide access to said transmitter means and to said battery.

6. A self-contained garage door opening transmitter module for attachment to the rear surface of an interior rearview mirror of a vehicle said rearview mirror including a housing having a rear wall with a mounting post extending therefrom for supporting the rearview mirror in the interior of said vehicle and a front supporting a mirror element, said rear wall of said housing having a predetermined configuration, comprising:

a transmitter housing having a forward wall, a rearward wall, and side walls providing an enclosure, said forward wall having a configuration corresponding at least along the peripheries thereof to the configuration of the rear wall of said rearview mirror, said transmitter housing being adapted to be secured to the rear wall of said rearview mirror housing and when so secured together said housings give the appearance of a one-piece housing;

said transmitter housing including an integral elongated housing having a central recess dividing said housing into two sections and permitting said housing to be attached to the rear surface of a rearview mirror with the mounting post for said rearview mirror extending through said recess;

a transmitter mounted within one section of said housing for radiating energy generally forwardly of the vehicle for activating a garage door opening receiver, and a battery positioned within the other section of said housing; and switch means mounted to said housing in a position readily accessible to the vehicle operator and coupling said battery to said transmitter for activating said transmitter.

7. The apparatus as defined in claim 6 wherein said housing includes a pair of access doors positioned to provide access to said transmitter and to said battery.

* * * * *